(No Model.) 4 Sheets—Sheet 1.
R. KÜBLER.
PRINTING TELEGRAPH.
No. 590,664. Patented Sept. 28, 1897.
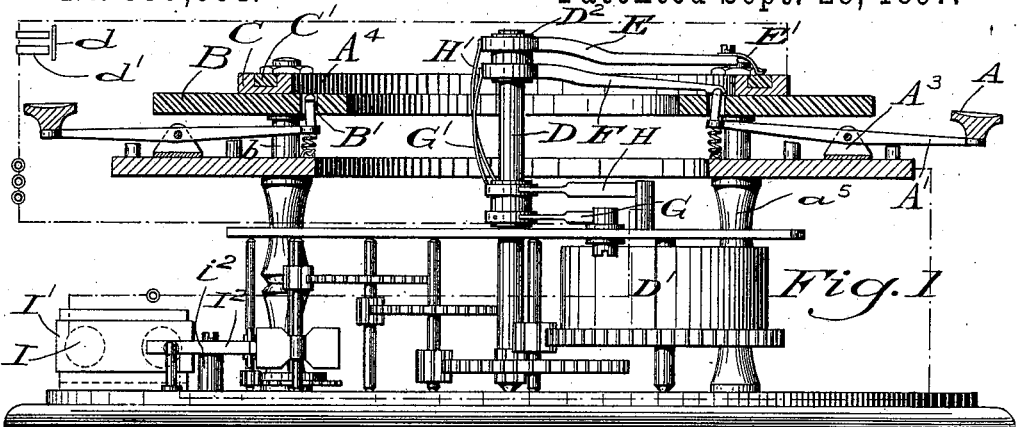
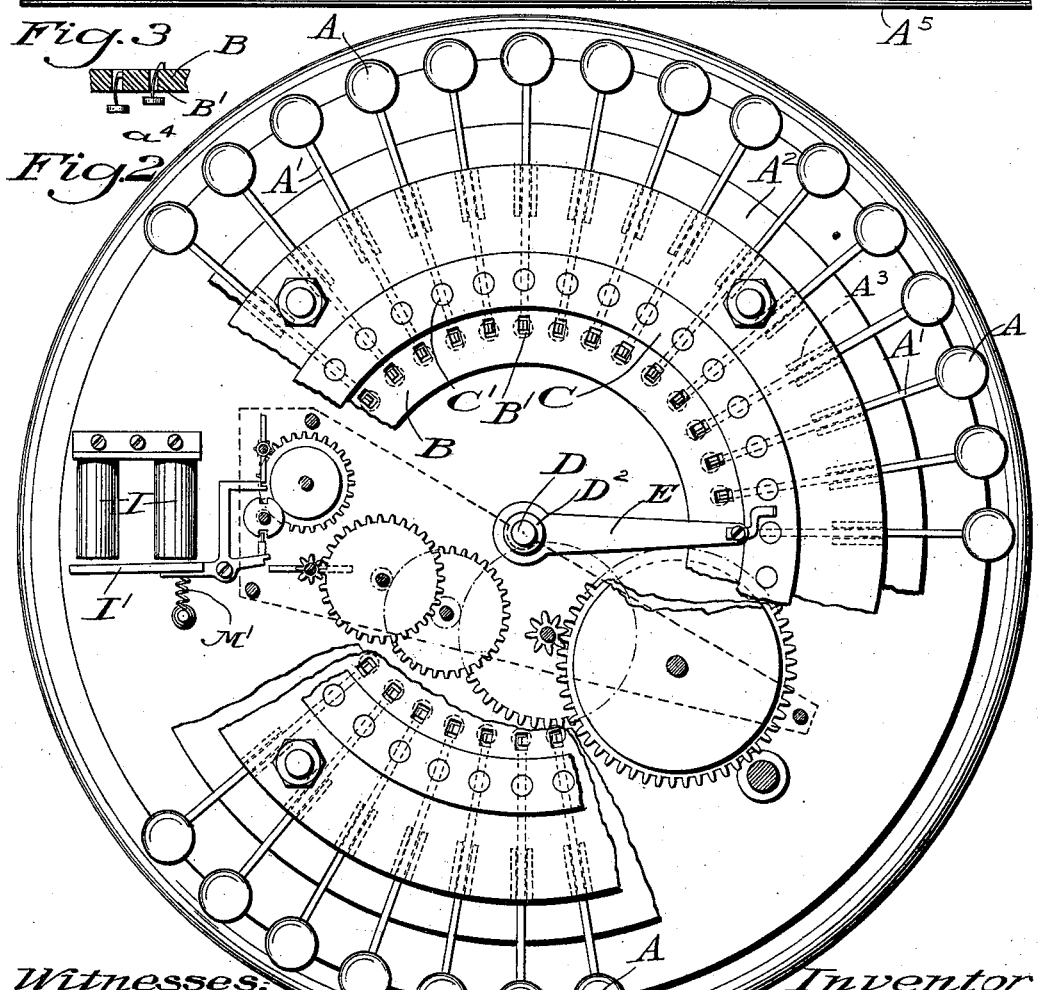
Witnesses: Inventor
Reinhold Kübler
By his Atty.

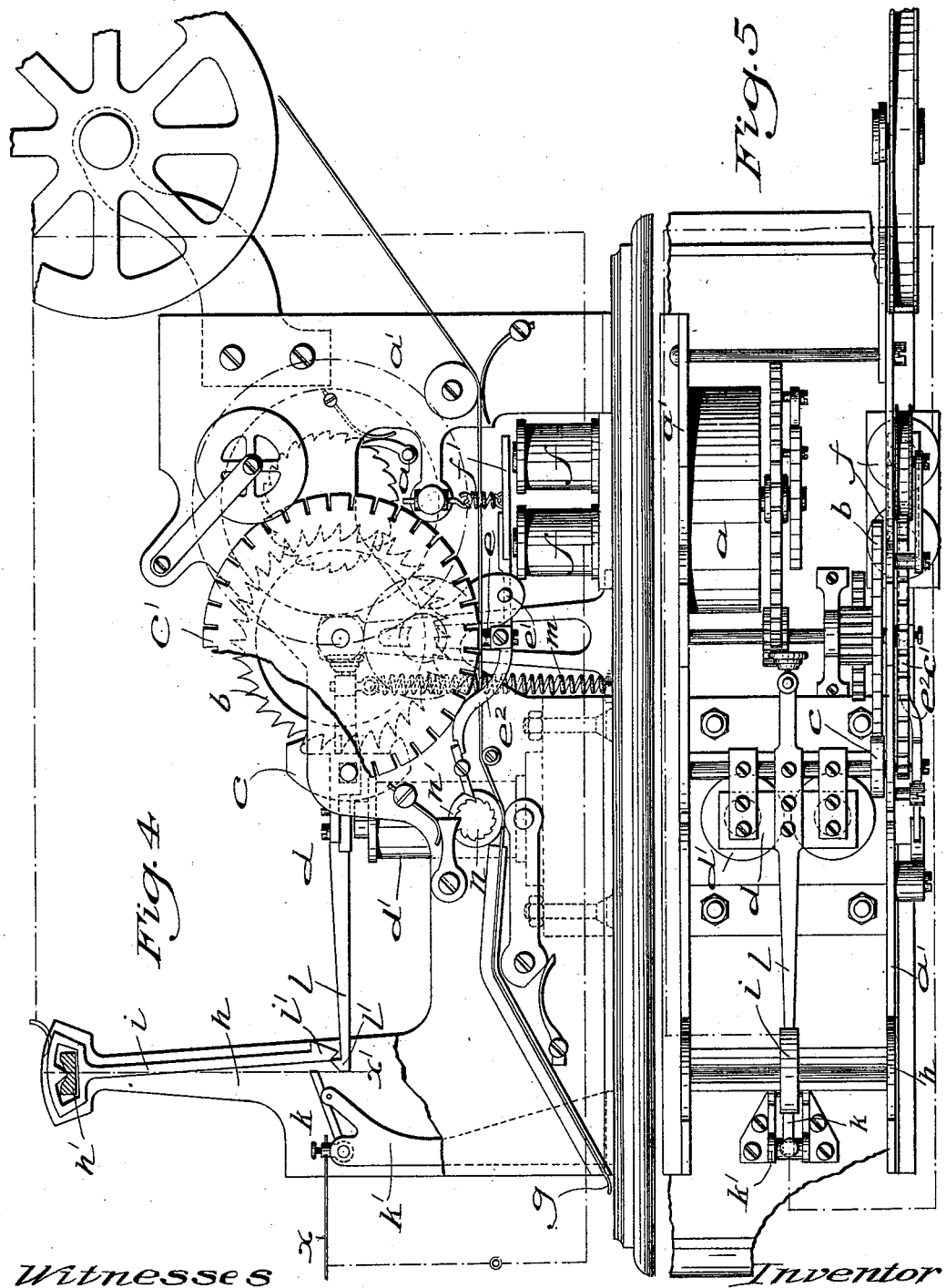

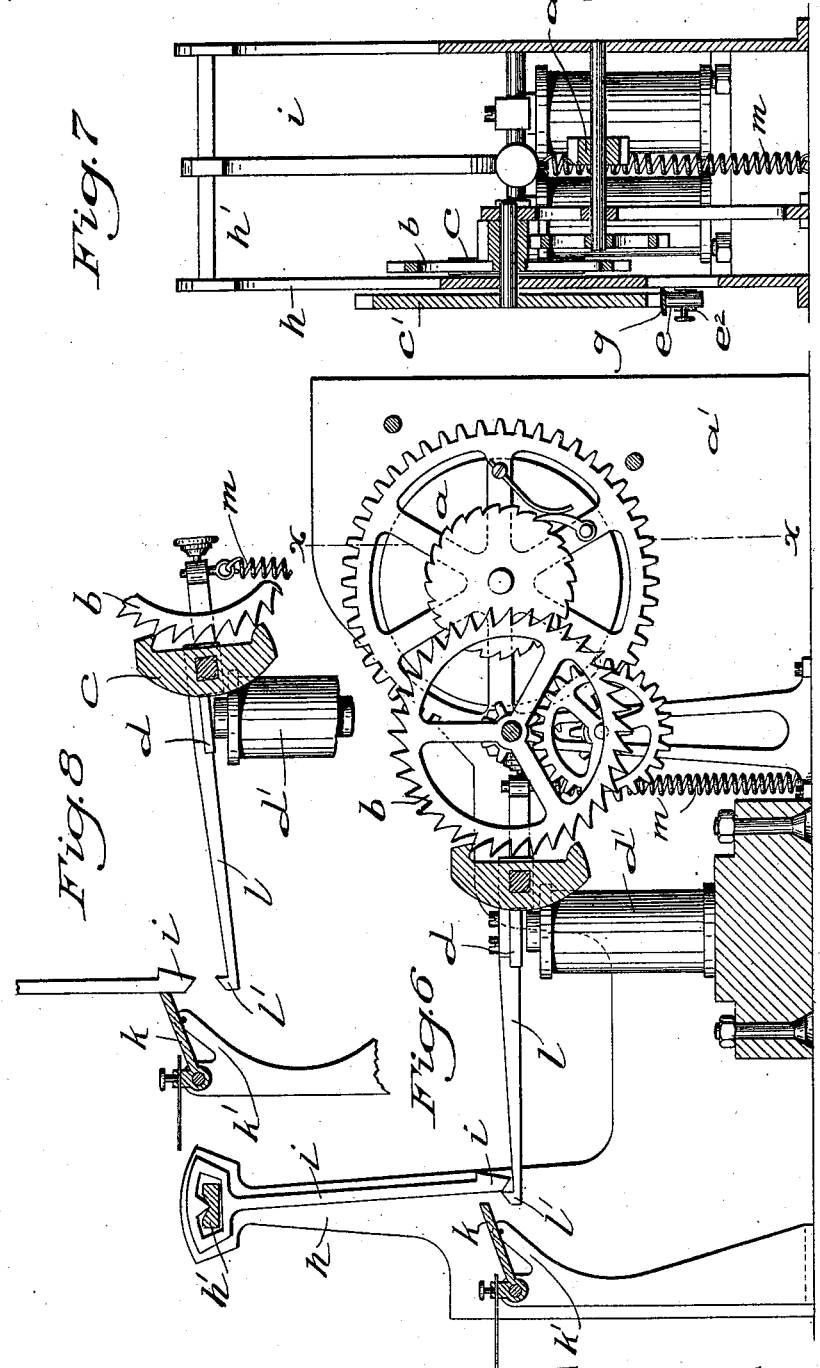

(No Model.) 4 Sheets—Sheet 4.

R. KÜBLER.
PRINTING TELEGRAPH.

No. 590,664. Patented Sept. 28, 1897.

Witnesses
Inventor
Reinhold Kübler
By his Atty

UNITED STATES PATENT OFFICE.

REINHOLD KÜBLER, OF BERLIN, GERMANY.

PRINTING-TELEGRAPH.

SPECIFICATION forming part of Letters Patent No. 590,664, dated September 28, 1897.

Application filed September 8, 1896. Serial No. 605,099. (No model.)

*To all whom it may concern:*

Be it known that I, REINHOLD KÜBLER, a citizen of the Kingdom of Prussia, and a resident of Berlin, in the Kingdom of Prussia and German Empire, have invented certain new and useful Improvements in Printing-Telegraphs, of which the following is a specification.

My invention relates to certain improvements in the transmitting and receiving instruments of a printing-telegraph apparatus, the general distinguishing features of which are described as follows: The transmitting instrument consists of a base and clockwork, to the former of which is attached a contact-ring provided with interruptions corresponding in number with the type of the receiving instrument and a revoluble arm adapted to cause interruptions in the main-line current, a key, a revoluble interruption-arm, a local circuit, a clockwork, a detent-lever for arresting the movement thereof, and a receiving instrument provided with printing mechanism adapted to be synchronously operated from the transmitting instrument.

My invention further consists in providing the receiving instrument with a pendulous detent-lever adapted to interrupt and retard the movement of the printing device connected therewith to insure a more perfect action of the latter, as will hereinafter appear.

Figure 9:
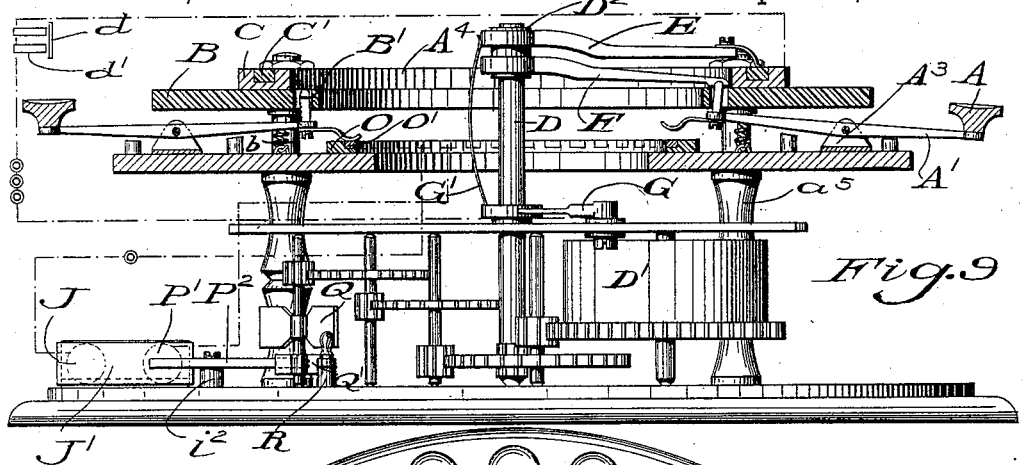

In the accompanying drawings, which illustrate my invention, Figure 1 is a vertical sectional elevation of a transmitting instrument embodying the primary and simplest form of my invention; Fig. 2, a plan view of the device shown in Fig. 1; Fig. 3, a sectional detail of the contact-plate and contact-spring ends of the key-levers; Fig. 4, a side elevation of the receiving instrument with the type-wheel and paper-holding wheel partly broken away; Fig. 5, a plan of the receiving instrument; Fig. 6, a sectional side elevation of the gearing, escapement, electromagnet, and escapement comprising the detent mechanism; Fig. 7, a transverse sectional elevation in line $x$ $x$ of Fig. 6; Fig. 8, a detail showing the contact position of the pendulum armature-lever and escapement of the detent mechanism; Fig. 9, a vertical sectional elevation of a transmitting instrument embodying a modified construction, and Fig. 10 a plan view of the device shown in Fig. 9.

In the transmitting apparatus, Fig. 1, the keys A, marked with the letters of the alphabet or other suitable characters, are secured to levers $A'$, journaled on brackets $A^3$, secured to a metallic disk ring $A^2$, which latter is supported by posts $a^5$ on a table $A^5$ in a horizontal position. The key-levers $A'$ are arranged radially in a circle upon the disk ring, and their inner ends have upwardly-projecting contact-pins $A^4$ thereon, which pass through slots $B'$, placed opposite them in a non-conducting fiber plate B, placed above them parallel to the disk ring and supported upon posts $b$, secured thereto.

Upon the plate B is placed a metal ring C, into which non-conducting fiber blocks $C'$ are set at regular intervals corresponding with the contact-pins $A^4$ of the keys. A spindle D is supported vertically in bearings upon a clock-framework $D'$, secured to the table $A^5$, and is actuated or constantly revolved by said clockwork when the instrument is in use. A non-conducting fiber boss $D^2$ is secured to the upper end of the spindle D and provides a bearing for two handle-like arms E F, which revolve with the said spindle, the upper arm E, with its contact-spring $E'$, sliding over the metal ring C and fiber blocks $C'$, while the lower arm F turns above the slots $B'$ in the non-conducting fiber ring and the ends of the contact-pins $A^4$ of the key-levers. The metal ring C is connected with one pole of a double-line main circuit, and the other pole of said circuit is connected by a sliding contact-strip G, resting upon the boss of the arm E, with a wire contact-strip $G'$, supported on the frame of the clockwork. By this means the sliding contact of spring $E'$ over the metal plate C and the fiber pieces $C'$ opens and closes the main circuit in very short intervals, thus causing synchronous excitement of the electromagnet in the main circuit at the receiving end of the line, as will be hereinafter described.

In order to provide ample time for the typewheel to print upon the paper at the receiving instrument, the main circuit must be held closed during the required time by means of an electromagnet in a local circuit of the transmitting instrument, which acts upon a brake to stop the clockwork of the transmitter opposite a non-conducting point during this interval, and thus close the circuit to the receiving instrument. This arrest of the clockwork-movement is effected by means of the arm F, turning with the spindle D, which engages with any one of the contact-pins $A^4$ of the key-levers, which may be lifted and which are held up when once lifted by spring-plate projections $a^4$ (shown by detail in Fig. 3) and bear against the walls of the slots $B'$ in the conducting-plate.

The arm F is connected by the sliding contact H and wire strip $H'$ with one pole of the local circuit, which energizes the electromagnet J, (represented by dotted lines, the said local circuit being represented by broken lines,) while the other pole of the local circuit is in connection with the metallic ring $A^2$. By this arrangement when the arm F reaches an uplifted contact-point $A^4$ of the key the circuit is closed and an excitation of the electromagnet I will take place. As the spring projection $a^4$ of the contact-pin $A^4$ only loosely touches the walls of the slot $B'$ of the fiber plate the key A will return in its position of rest at once when the arm F presses upon it.

The clockwork $D'$ is arrested in its movement by the stop-lever $I^2$, pivoted to a post $i^2$ on the table $A^5$ and acted upon by the armature $I'$ of the electromagnet I in one direction and by a spring $M'$ in the opposite direction. The duration of time effected by this stop mechanism is sufficient for exciting the local circuit of the receiving-station, where it is prolonged sufficiently to make a clear imprint of the type upon the paper.

The construction of the receiving instrument is clearly shown in Figs. 4 and 5 of the drawings.

Between the side plates $a'$ of the apparatus is arranged a clockwork $a$, the movement of which is regulated by an escapement-wheel $b$ and anchor-escapement $c$, the axis of which is the same as that of the armature $d$ of an electromagnet $d'$, securely bolted in an upright position upon the base, the coils of said magnet being interposed in the main circuit. If the arm E of the transmitting instrument revolves with very short intervals, the interruption of the main circuit will be correspondingly short duration. When this interruption of the main circuit occurs, the armature $d$, and with it the escapement $c$, will oscillate and the escapement-wheel $b$ and type-wheel $c'$ will advance one tooth. An impression-block $e$ is fixed to the end of a lever $e^2$, oscillating upon pivot $e'$, and is lifted beneath the paper and opposite the type-wheel, which latter is revolved synchronously with the arm E of the transmitting instrument to cause the letter presented above the block $e$ at the receiving instrument to correspond with the letter upon the key opposite said lever at the transmitting instrument. The other end of lever $e^2$ carries the armature $f'$ of an electromagnet $f$, interposed in the local circuit (indicated by broken lines) of the receiving instrument. The paper is pressed and held against the type a sufficient length of time to cause a clear and perfect imprint by arresting the movement of the clockwork of the receiving instrument a moment to cause the required interruption or continued closing of the main circuit by means of a pendulum-contact (shown at the left side of Fig. 4) which is caused to swing above and opposite the free end of the armature-lever $l$ and is suspended from insulated bearings $h'$ upon supports $h$, extending upwardly from the side plates of the frame. The pivoted end of the metallic pendulum $i$ is formed with an arch-shaped bearing, upon which is a sliding contact-plate $x$, of one pole of a local circuit, while the other pole $x'$ of said circuit is fixed to contact-lever $k$, journaled loosely upon the standard $k'$ of the frame and held at an angle which will permit it to easily lift out of the way of the swinging pendulum and maintain contact therewith. The armature-lever $l$ has a tooth $l'$ at its free end which engages the beveled tooth $i'$ of the swinging end of pendulum $i$ (see Fig. 8) and normally swings and holds the said pendulum swung to one side and away from the contact-lever $k$ and normally prevents it from freely swinging until a prolonged closing of the main circuit has been caused by pressing down a key and arresting the movement of the revolving arm E of the transmitting instrument. When this is done, the armature $d$ of lever $l$ is released by the electromagnet $d'$, and the hook $l'$ will release the hook $i'$ of the pendulum, thus permitting the latter to swing back in contact with the lever $k$ and close the local circuit, thus pressing the block $e$ on the end of the armature-lever up against the type the required time to make an impression upon the paper, as follows: The regular movements of the lever $l$ follow so quickly that the pendulum ordinarily cannot freely swing, as it is held by the tooth $l'$ until the arm E of the receiving instrument is arrested by a key and the main circuit is held closed sufficiently to set free the tooth $i'$ of the pendulum $i$ and allow the latter to swing over and close the local circuit. When the current of the main circuit is opened, the armature is pulled down by a spring $m$, attached thereto and to the base, and the tooth $l'$ of the armature-lever $l$ mounts upon the inclined face of the tooth $i'$ of the pendulum and pulls it away from contact with the pivoted lever $k$, thus breaking the local circuit and releasing the block $e$ from pressing upon the type-wheel, and also draws down the arm $e^2$ to engage with the ratchet-wheel $n$ of a friction-roller $n'$ and moves forward a paper strip $g$ the distance required for each type.

Figure 10:
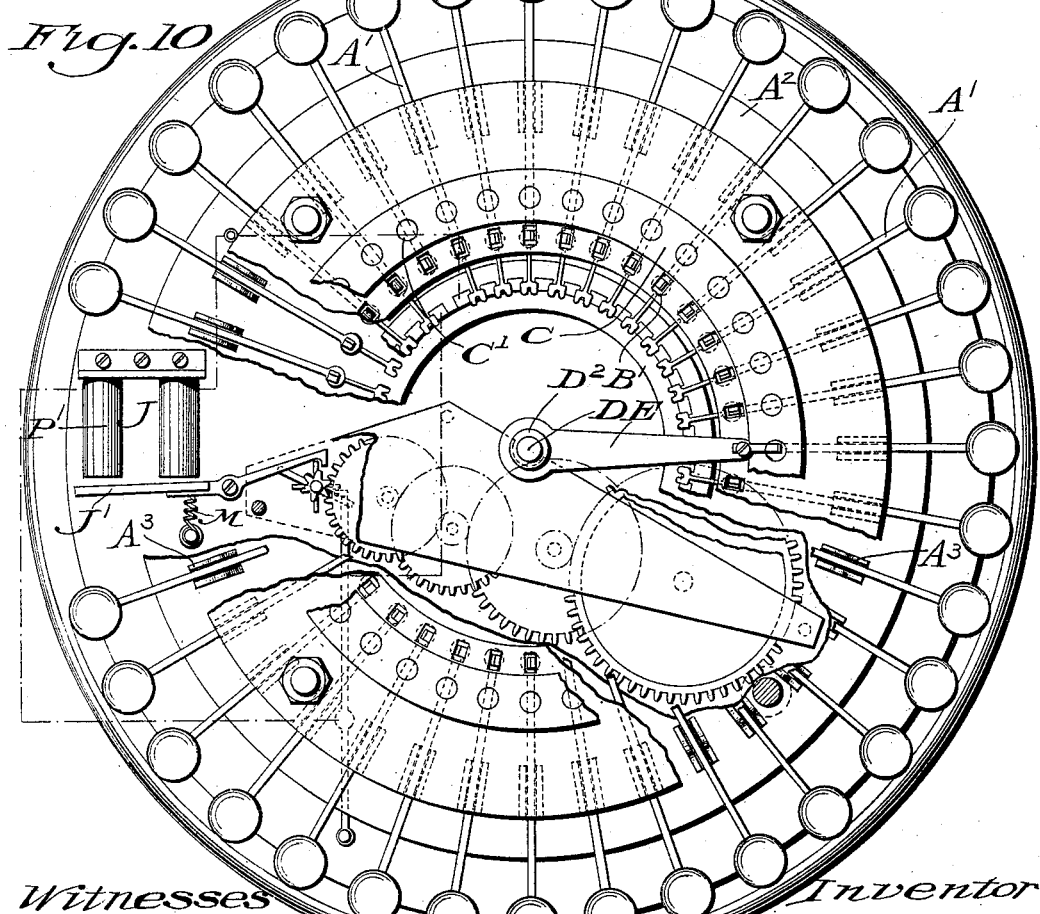

A modification of the construction of the transmitting instrument is shown in Figs. 9 and 10 of the drawings to adapt it to be used with an open circuit, the operating-clockwork being arrested by a closed local circuit and is only set free by an interruption of the main circuit effected by pressing down one of the keys of the transmitting instrument until the rotating arm arriving at the key pressed down will close again the circuit and arrest the clockwork.

The essential differences are as follows: Upon the metallic ring A² is put a fiber ring O, having metallic pieces O' exceeding by one in number the number of keys, two of said metallic pieces O' being connected with the poles of a local circuit, (shown by dot and dash lines, Figs. 9 and 10,) the space between left open, while the spaces between the other metal pieces are each spanned by a T-shaped contact-spring fitted upon the lever A' at the lower side and end thereof. When all of the keys are out of action, the current is closed and the electromagnet P', Figs. 9 and 10, will attract its keeper, whose arm P² arrests the fly-brake Q by means of the arm Q', fixed upon its axle. The ratchet-lever R is intended for closing the local circuit in the beginning of the movement and for arresting and releasing the wind-brake Q² when desired. If a key on the transmitting instrument is pressed down, the arm P² lets the wind-brake free as the main circuit is opened and the clockwork moves till the arm F is arrested by the uplifted contact-pin of the depressed key and the current for arresting the clockwork by closing the local circuit and energizing the electromagnet P', thus attracting the armature J' and causing the lever P² with its tooth to engage with one of the vanes of the windbrake. As the sliding contact-piece E' of the arm E in the main circuit touches the metal at the moment the arm F is arrested, as above described, the said circuit is closed and the receiving instrument will be operated as above described.

The construction shown in the modification described has the advantage that the typewheel of the receiving instrument cannot be disarranged and its movement disynchronized with that of the transmitting instrument, and the clockwork for actuating the said instruments will not run down so rapidly as in the first-described construction of the transmitting instrument, and, furthermore, the circuit is kept closed in the transmitting instrument until the next key has been pushed down, which time is sufficient to enable the pendulum to make its full movement and thus give the printing apparatus time to act in a satisfactory manner.

I claim as my invention and desire to secure by Letters Patent—

1. A transmitting instrument for printing-telegraphs, comprising a base and clockwork, a metallic key-supporting ring supported thereon, of a metallic contact-ring provided with interrupting insulations and insulated from the key-supporting ring, a contact-arm revoluble thereon by the clockwork and connected with the main circuit and a key for closing a local circuit and causing the arrest of the said clockwork and arm to control the local circuit and the synchronously-operated mechanism of a corresponding receiving instrument, substantially as described.

2. A transmitting instrument for printing-telegraphs, comprising a base, a contact-ring thereon provided with interruptions, a revoluble contact-arm adapted to place any one of the contact-points of said ring in circuit, a corresponding independent and synchronously-revoluble interruption-arm and key-levers each carrying pins for arresting the rotation of said interruption-arm and arranged in a circle beneath said arms for controlling the motor-circuit of the synchronously-operating mechanism of a corresponding receiving instrument, substantially as described.

3. A transmitting instrument for printing-telegraphs, comprising a base and operating-clockwork, two commonly-revoluble contact-arms, a main circuit, a contact-ring provided with interruptions adapted to one of said arms to effect closings of the main circuit, key-levers, a local circuit connected with said clockwork and closed by said key-levers for arresting said clockwork to prolong the length of the main current to insure the proper action of the printing device of the receiving instrument, substantially as described.

4. A transmitting instrument for printing-telegraphs, comprising a base, a contact-ring provided with interruptions, a revoluble contact-arm adapted to place any one of the contact-points of said ring in the main circuit with a receiving instrument, a metallic key-contact ring provided with interruptions and keys adapted to close a local circuit connecting two of the contact-points of said key-contact ring, and adapted to be closed by said keys to arrest the movement of the said revoluble arm of the main circuit, substantially as described.

5. The combination with a receiving instrument for printing-telegraphs, of a pendulum, an electromagnet, an armature, a synchronously-revoluble type-wheel and impression-lever embraced in a local circuit, and a lever-arm on the said armature provided with a tooth to engage with the swinging end of the pendulum, substantially as described.

6. In a printing-telegraph instrument, the combination with the clockwork for operating the same adapted to be placed in an electric circuit of an electromagnet, an armature carrying a detent-lever having a beveled tooth, a pendulum connected at its pivotal end with the contact, of one pole of the circuit and having a tooth to normally maintain contact with the tooth of the detent-lever, a pivoted contact-lever connected with the other pole of said circuit and adapted to swing and close the contact with said pendulum during the prolonged interval of said current, substantially as described.

In testimony that I claim the foregoing as my invention I have signed my name in presence of two subscribing witnesses.

REINHOLD KÜBLER.

Witnesses:
W. HAUPT,
HENRY HASPER.